United States Patent
Wang et al.

(10) Patent No.: US 8,325,422 B2
(45) Date of Patent: Dec. 4, 2012

(54) ZOOM LENS

(75) Inventors: Kuo-Chuan Wang, Hsinchu (TW); Hsin-Te Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 19 days.

(21) Appl. No.: 13/186,484

(22) Filed: Jul. 20, 2011

(65) Prior Publication Data

US 2012/0026603 A1  Feb. 2, 2012

(30) Foreign Application Priority Data

Jul. 29, 2010  (TW) ................................ 99125124 A

(51) Int. Cl.
*G02B 15/14* (2006.01)

(52) U.S. Cl. ........ 359/680; 359/682; 359/683; 359/684; 359/685; 359/715; 359/726; 359/737; 359/753; 359/781

(58) Field of Classification Search .................. 359/680, 359/682, 683–685, 715, 726, 737, 753, 781
See application file for complete search history.

(56) References Cited

U.S. PATENT DOCUMENTS

| 7,110,186 | B2 | 9/2006 | Sueyoshi | |
|---|---|---|---|---|
| 7,177,100 | B2 | 2/2007 | Tomioka | |
| 7,242,529 | B2 | 7/2007 | Sato et al. | |
| 7,286,229 | B1 | 10/2007 | Meeks | |
| 7,623,297 | B2 | 11/2009 | Shinohara | |
| 2004/0027685 | A1* | 2/2004 | Mihara et al. | 359/686 |
| 2008/0088943 | A1 | 4/2008 | Shirota | |
| 2009/0002842 | A1* | 1/2009 | Souma | 359/684 |
| 2009/0067060 | A1* | 3/2009 | Sudoh | 359/683 |

* cited by examiner

*Primary Examiner* — Evelyn A. Lester
(74) *Attorney, Agent, or Firm* — Jianq Chyun IP Office

(57) ABSTRACT

A zoom lens disposed between an object side and an image side and including a first, second, third, and fourth lens group is provided. The first lens group has a negative refractive power and includes a first lens and a prism arranged in sequence from the object side to the image side. The first lens is an aspheric lens. A distance between the first lens and the prism is L, an effective focal length of the zoom lens at a wide-end is fw, and 1.58<L/fw<1.88. The second lens group disposed between the first lens group and the image side has a positive power and includes a first double cemented lens. The third lens group disposed between the second lens group and the image side has a negative power and includes a second double cemented lens. The fourth lens group has a positive power.

23 Claims, 11 Drawing Sheets

ZOOM LENS

CROSS-REFERENCE TO RELATED APPLICATION

This application claims the priority benefit of Taiwan application serial no. 99125124, filed on Jul. 29, 2010. The entirety of the above-mentioned patent application is hereby incorporated by reference herein and made a part of this specification.

BACKGROUND OF THE DISCLOSURE

1. Field of Invention

The invention generally relates to a lens, and more particularly, to a zoom lens.

2. Description of Related Art

As state of the art videoconferencing technologies advance, the need for a high pixel and high quality digital video camera (DVC) and digital camera (DC) has been gradually rising, while trending towards miniaturization, large stops, and wide view angle. In order to achieve large stops and wide view angle within a small space, a significant emphasis is placed on the lens design framework.

However, in current zoom lens designs, due to more manufacturing difficulties and limited by stricter tolerances, these designs cannot concurrently achieve advantages of high resolution, large stops, and wide angle of view. Moreover, insufficient luminous flux, noise accumulation, and underexposure typically results when small stops are applied in digital video cameras used during nighttime. For example, U.S. Pat. Nos. 7,242,529 and 7,110,186 disclose stops having F-numbers above 3.5, which may easily result in insufficient luminous flux.

Moreover, in the zoom lens disclosed by U.S. Pat. No. 7,242,529, not only does the disclosed zoom lens not meet the need of large stops, but a field of view is only 31.9 degrees, resulting in a reduced shooting range and insufficient luminous flux. On the other hand, although the zoom lens disclosed by U.S. Pat. No. 7,177,100 has advantages such as a 3× zoom capability, a wide angle of view, and large stops, the zoom function cannot be accomplished within the lens body, and therefore the lens module cannot be miniaturized.

Furthermore, U.S. Pat. No. 7,623,297 discloses a zoom lens. The zoom lens includes five lens groups, one of the five lens groups is a prism. US Patent Publication No. 20080088943 discloses a zoom lens including four lens groups.

SUMMARY OF THE INVENTION

Accordingly, the invention is directed to an zoom lens with a zoom function and a small size.

Other objects and advantages of the invention can be further illustrated by the technical features broadly embodied and described as follows.

In order to achieve one or a part of or all of the above advantages or other advantages, an embodiment of the invention provides a zoom lens. The zoom lens is disposed between an object side and an image side, and the zoom lens includes a first lens group, a second lens group, a third lens group, and a fourth lens group. The first lens group has a negative refractive power and includes a first lens and a prism arranged in sequence from the object side to the image side. The first lens is an aspheric lens. A distance between the first lens and the prism is L, and an effective focal length (EFL) of the zoom lens at a wide-end is fw, and $1.58 < L/fw < 1.88$. The second lens group has a positive refractive power and is disposed between the first lens group and the image side. Moreover, the second lens group includes a first double cemented lens. The third lens group has a negative refractive power and is disposed between the second lens group and the image side. Moreover, the third lens group includes a second double cemented lens. The fourth lens group has a positive refractive power and is disposed between the third lens group and the image side.

In summary, the embodiments of the invention can achieve at least one of the following advantages or effects. Embodiments of the invention adopt a negative, positive, negative, positive combination for the refractive powers of the first through fourth lens groups, thereby effectively eliminating an image aberration. Moreover, with complementing aspheric lenses, double cemented lenses, and prisms, an effect of miniaturization is achieved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items.

Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
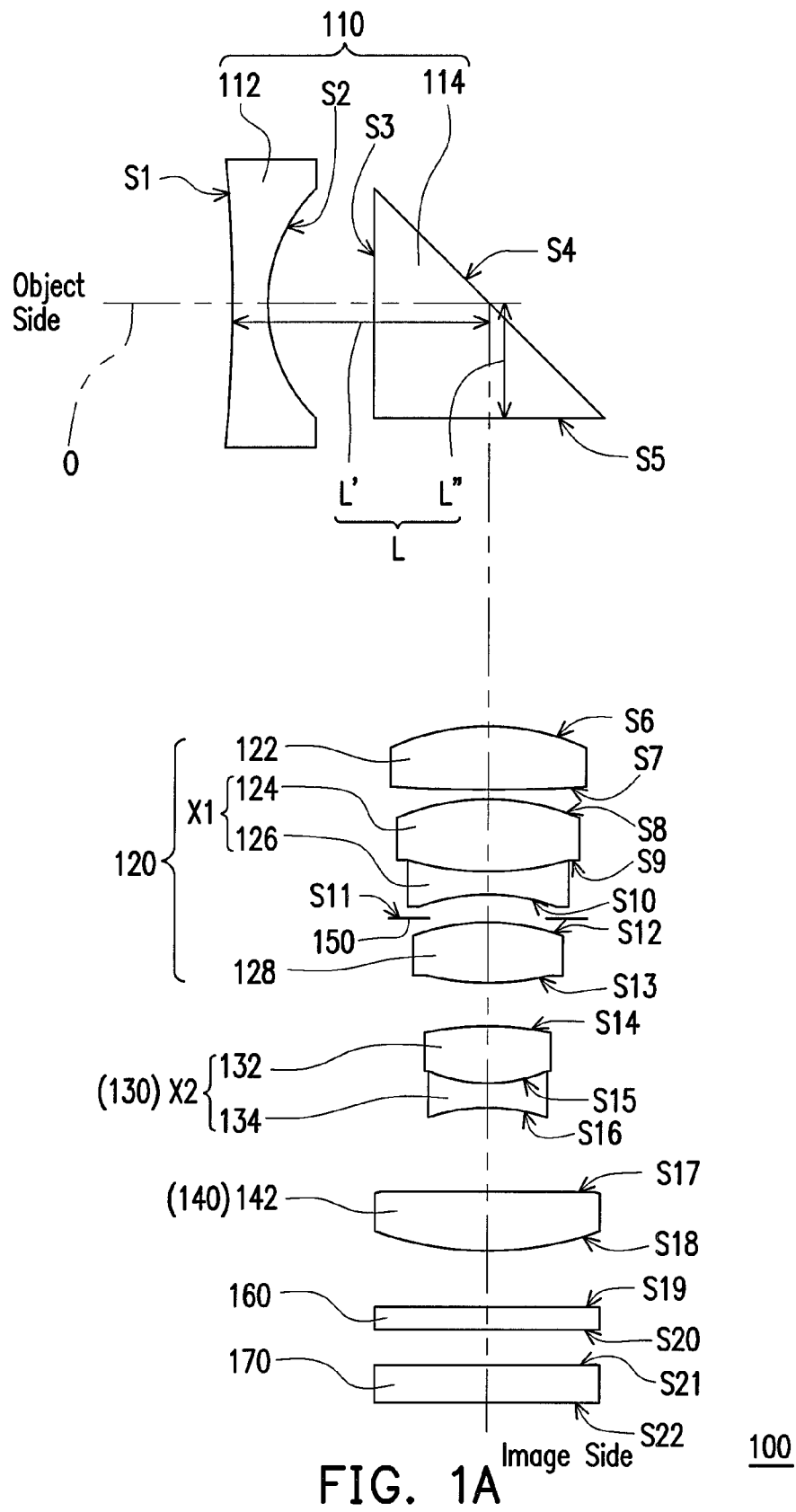
FIGS. 1A to 1C are schematic cross-sectional views illustrating a zoom lens under different zoom ratios according to an embodiment of the invention.
Figure 1B:
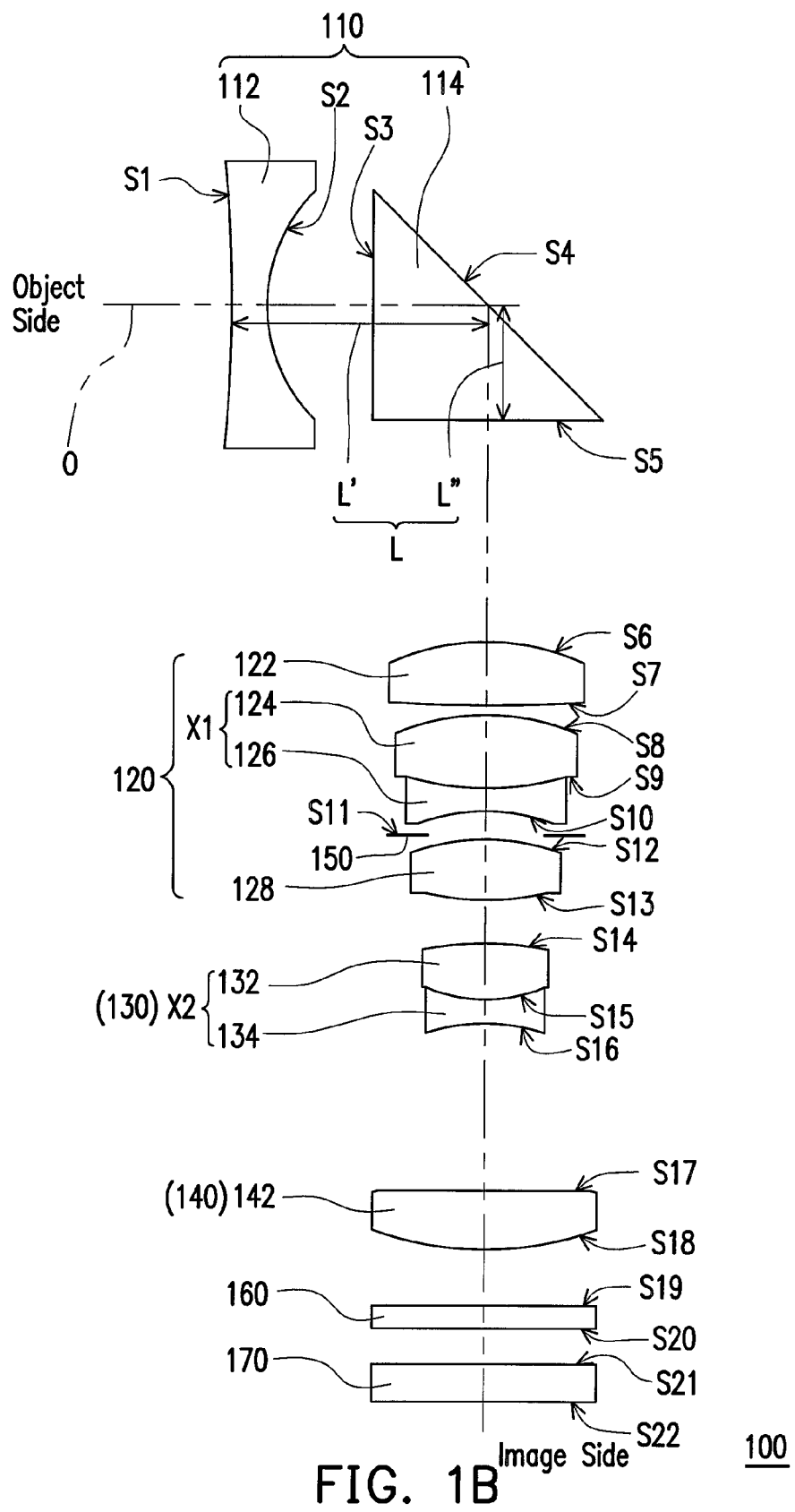
Figure 1C:
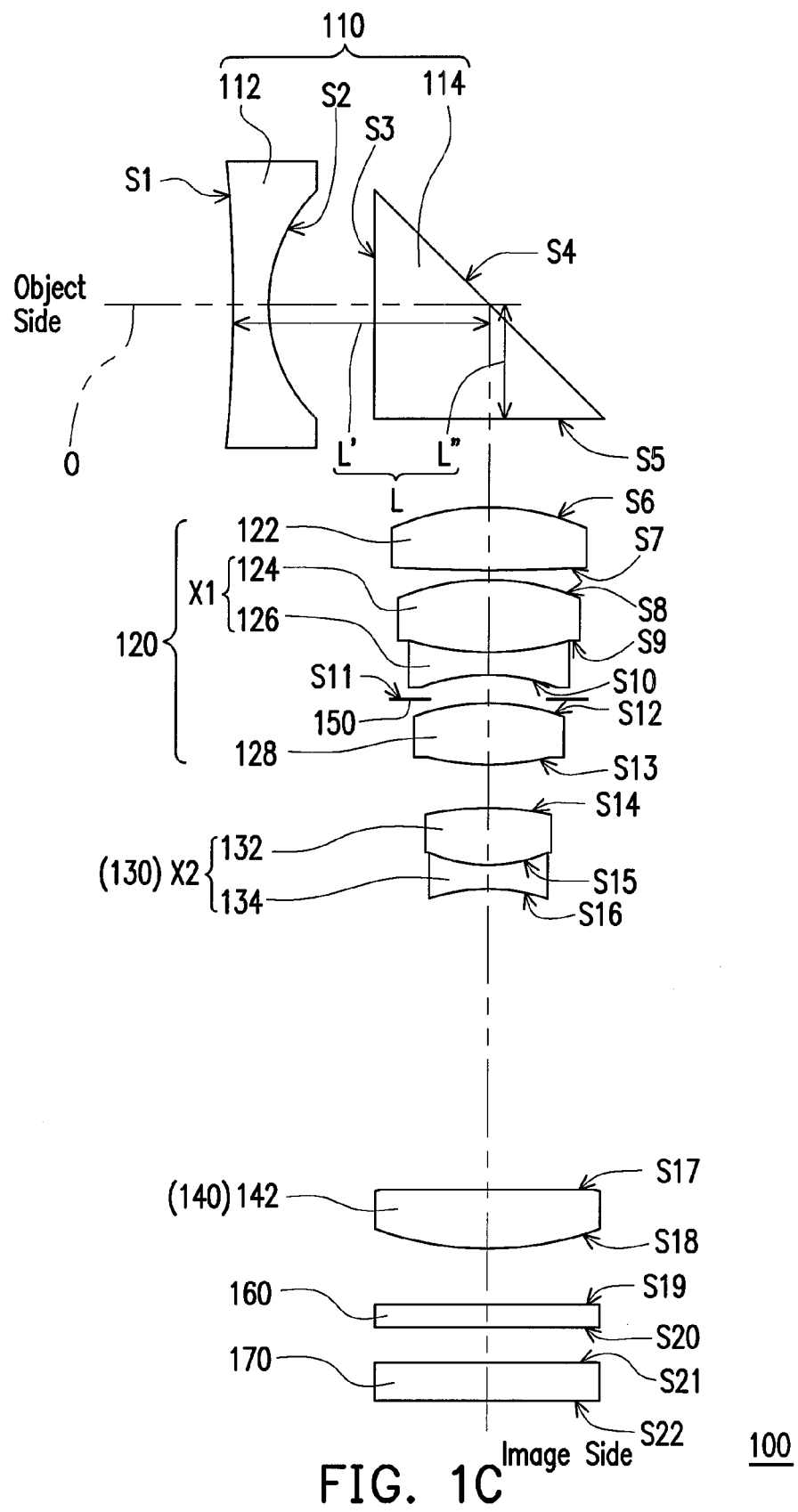

FIGS. 1A to 1C are schematic cross-sectional views illustrating a zoom lens under different zoom ratios according to an embodiment of the invention. FIG. 1A illustrates the structure of the zoom lens at a wide-end, FIG. 1B illustrates the structure of the zoom lens at a middle position, and FIG. 1C illustrates the structure of the zoom lens at a tele-end. Referring to FIGS. 1A to 1C, a zoom lens 100 of the present embodiment is disposed between an object side and an image side, and the zoom lens 100 is adapted for imaging a scene on the object side at the image side. Photosensitive devices such as a charged-coupled device (CCD), a complementary metal-oxide semiconductor (CMOS), or photonegatives may be disposed on the image side.

As shown in FIG. 1A, the zoom lens 100 includes a first lens group 110, a second lens group 120, a third lens group 130, and a fourth lens group 140 arranged in sequence from the object side to the image side. The first lens group 110, the second lens group 120, the third lens group 130, and the fourth lens group 140 have refractive powers of negative, positive, negative, and positive powers, respectively. The second lens group 120 is adapted to move between the first lens group 110 and the third lens group 130. The third lens group 130 is adapted to move between the second lens group 120 and the fourth lens group 140.

Specifically, the first lens group 110 includes a first lens 112 and a prism 114 arranged in sequence from the object side to the image side, and the first lens 112 is an aspheric lens. The second lens group 120 is disposed between the first lens group 110 and the image side, and the second lens group 120 includes a first double cemented lens X1. The third lens group 130 is disposed between the second lens group 120 and the image side, and the third lens group 130 includes a second double cemented lens X2. The fourth lens group 140 is disposed between the third lens group 130 and the image side.

Furthermore, the zoom lens 100 of the present embodiment may satisfy the following condition:

$$1.58 < L/fw < 1.88 \quad (1)$$

in which L is a distance between the first lens 112 and the prism 114, and fw is an effective focal length (EFL) of the zoom lens 110 at the wide-end. With regards to the framework of the zoom lens according to the present embodiment, it should be noted that the distance L is a total length of an optical axis distance L' and an optical axis distance L".

When L/fw>1.88, lens miniaturization cannot be achieved since the length of the first lens group 110 is overly long. On the other hand, when L/fw<1.58, the refractive power of the first lens group is too high, which results in an increase of a diameter of the first lens 112 in the first lens group 110. Accordingly, the manufacturing cost rises while lens miniaturization cannot be achieved. Moreover, when the refractive power of the first lens group is large, a distortion and an image aberration of the zoom lens 100 are difficult to eliminate.

Furthermore, the zoom lens 100 of the present embodiment may also satisfy the following condition:

$$1.45 < D1/fw < 1.8 \quad (2)$$

in which D1 is a dimension of the diameter of the first lens 112. When D1/fw>1.8, the diameter D1 of the first lens 112 in the first lens group 110 is large, therefore the size of the zoom lens 100 increases, and accordingly the effect of lens miniaturization cannot be achieved. On the other hand, when D1/fw<1.45, the diameter of the first lens 112 is small, and therefore the refractive power of the first lens group 110 need be increased to achieve a same view angle. However, the method described above results in a difficult image aberration correction process. Although increasing the number of lenses may improve the image aberration, the cost for the lenses is increased.

Moreover, the zoom lens 100 of the present embodiment may also satisfy the following condition:

$$2.6 < fG4/fw < 3.9 \quad (3)$$

in which fG4 is an EFL of the fourth lens group 140. When fG4/fw>3.9, an included angle of a light path of a marginal ray incident upon the image plane and an optical axis O decreases. In other words, a numerical aperture (NA) of the lens is reduced, and therefore the property of large stops cannot be achieved. On the other hand, when fG4/fw<2.6, a back focal length of the lens is too short, thereby resulting in hurdles when the photosensitive devices are assembled, and increasing the degree of difficulty in eliminating the image aberration of the lens.

Furthermore, the zoom lens 100 of the present embodiment may also satisfy the following condition:

$$Ndp > 1.69 \quad (4)$$

in which Ndp is a refractive index of the prism 114. In the embodiment, since Ndp>1.69, the diameter dimension and thickness of the prism 114 may be reduced, thereby achieving the effect of lens miniaturization.

The composition of each of the lens groups in the zoom lens 100 will be illustrated below, but the invention should not be construed as limited to the description hereafter.

Continuing reference to FIG. 1A, in the embodiment, the refractive power of the first lens 112 is negative, and the first lens 112 is a biconcave lens. Moreover, the second lens group 120 of the embodiment further includes a second lens 122, a third lens 124, a fourth lens 126, and a fifth lens 128. The third lens 124 and the fourth lens 126 are formed a first double cemented lens X1. The refractive powers of the second lens 122 and the fifth lens 128 are positive, and both the second lens 122 and the fifth lens 128 are biconvex lenses. The refractive powers of the third lens 124 and the fourth lens 126 are opposite to each other. In the embodiment, the refractive power of the third lens 124 is positive, and the refractive power of the fourth lens 126 is negative. Moreover, the third lens 124 is a biconvex lens, and the fourth lens 126 is a biconcave lens.

On the other hand, a second double cemented lens X2 is formed by a sixth lens 132 and a seventh lens 134, and the refractive powers of the sixth lens 132 and the seventh lens 134 are opposite to each other. In the embodiment, the refractive power of the sixth lens 132 is positive, and the refractive power of the seventh lens 134 is negative. Moreover, the sixth lens 132 is a biconvex lens, and the seventh lens 134 is a biconcave lens. The fourth lens group 140 includes an eighth lens 142 which may be an aspheric lens or a spherical lens. The refractive power of the eighth lens 142 is positive, and the eighth lens 142 is a biconvex lens.

Since the four lens groups 110, 120, 130, and 140 in the zoom lens 100 of the embodiment adopt a negative, positive, negative, positive combination for the refractive powers thereof, the degree of the image aberration for the zoom lens 100 can be effectively reduced. Furthermore, the zoom lens 100 may have a 3× zoom function. As shown by FIGS. 1A to 1C, when a zoom ratio of the zoom lens 100 gradually changes from the wide-end, the middle position, and to the tele-end, the second lens group 120 and the third lens group 130 are moving toward the direction of the first lens group 110.

It should be noted that, the zoom ratio of the embodiment refers to the effective focal range of the zoom lens 100, or the ratio of the largest EFL to the smallest EFL in the zoom lens 100. In other words, when the second lens group 120 and the third lens group 130 are moving between the first lens group 110 and the fourth lens group 140, the EFL of the zoom lens 100 varies within a specific range. Accordingly, the zoom ratio of the zoom lens 100 is defined as the ratio of the largest EFL to the smallest EFL thereof.

Further, the second lens group 120 is a zoom group, the third lens group 130 is a focus compensation group, and the second lens group 120 and the third lens group 130 are adapted to move correspondingly between the first lens group 110 and the fourth lens group 140. When the zoom ratio is small, the second lens group 120 and the third lens group 130 are moved away from the first lens group 110, or toward the wide-end. When the zoom ratio is large, the second lens group 120 and the third lens group 130 are moved near the first lens group 110, or toward the tele-end. In other words, by moving the second lens group 120 and the third lens group 130, the zoom lens 100 of the embodiment can achieve the effect of a 3× zoom function. However, in other embodiments of the invention, the zoom ratio of the zoom lens 100 may be designed in accordance with actual requirements to be, for example, larger than 1 and smaller than or equal to 3.3.

Moreover, as shown in FIG. 1A, the first lens group 110 further includes a 90 degree prism 114. The prism 114 can bend the light path of the zoom lens 100 such that the optical zooming method is performed within the lens body. Accordingly, the zoom lens 100 can achieve the effect of lens miniaturization. For example, since the optical zoom function is accomplished within the lens body of the zoom lens 100, the zoom lens 100 may be configured inside a mobile phone to improve upon an inadequate image quality of a mobile phone camera lens after digital zooming Alternatively, the zoom lens 100 may be applied in a miniature digital video (DV) product.

From another perspective, in the embodiment, since the refractive power of the fourth lens group 140 is positive, an included angle of a light path of a marginal ray incident upon the image plane and an optical axis O is increased. Accordingly, the numerical aperture of the zoom lens 100 is increased and a F-number of a stop is lowered, thereby achieving the property of large stops.

In the embodiment, the first lens 112 and the fifth lens 128 in the first lens group 110 are aspheric lenses, the eighth lens 142 may be an aspheric lens or a spherical lens, and the rest of the five lenses in the zoom lens 100 are all spherical lenses. With complementary aspheric lenses and spherical lenses, the zoom lens 100 can achieve the effect of a 3× zoom with high resolution. For example, a resolution of the zoom lens 100 may be between 500 mega-pixels to 800 mega-pixels.

In order for the zoom lens 100 to achieve a even more preferable optical quality, the zoom lens 100 may further include an aperture stop 150 disposed in the second lens group 120. More specifically, the aperture stop 150 is disposed between the fourth lens 126 and the fifth lens 128 for controlling an incident light quantity. Moreover, the zoom lens 100 may further include a cut filter 160 and a cover glass 170. The cut filter 160 is disposed between the fourth lens group 140 and the image side. The cut filter 160 is, for example, an infrared (IR) cut filter. The cover glass 170 is disposed between the cut filter 160 and the image side.

An embodiment of the zoom lens 100 is given hereinafter. However, the invention is not limited to the data listed in Table 1. It should be known to those ordinarily skilled in the art that various modifications and variations can be made to the parameters or the structure of the invention without departing from the scope or spirit of the invention.

TABLE 1

| Surface | Radius of Curvature (mm) | Thickness (mm) | Refractive Index | Abbe Number | Remarks |
|---------|--------------------------|----------------|------------------|-------------|---------|
| S1  | −45.77   | 0.9 | 1.53 | 56    | First Lens |
| S2  | 3.71     | 1.4 |      |       |            |
| S3  | infinity | 2.9 | 1.79 | 44.2  | Prism |
| S4  | infinity | 2.9 | 1.79 | 44.2  |       |
| S5  | infinity | 7.9 |      |       |       |
| S6  | 5.82     | 1.6 | 1.52 | 52.4  | Second Lens |
| S7  | −40.10   | 0.1 |      |       |       |
| S8  | 5.45     | 1.9 | 1.49 | 70.2  | Third Lens |
| S9  | −7.34    | 0.6 | 1.80 | 46.6  | Fourth Lens |
| S10 | 5.34     | 0.4 |      |       |       |
| S11 | infinity | 0.1 |      |       | Aperture Stop |
| S12 | 5.02     | 1.5 | 1.58 | 59.3  | Fifth Lens |
| S13 | −8.48    | 0.8 |      |       |       |
| S14 | 7.75     | 1.4 | 1.49 | 70.2  | Sixth Lens |
| S15 | −4.09    | 0.6 | 1.83 | 37.2  | Seventh Lens |
| S16 | 4.82     | 1.6 |      |       |       |
| S17 | 113.38   | 1.5 | 1.53 | 48.8  | Eighth Lens |
| S18 | −8.35    | 3.1 |      |       |       |
| S19 | infinity | 0.3 | 1.52 | 64.14 | Cut Filter |
| S20 | infinity | 0.1 |      |       |       |
| S21 | infinity | 0.5 | 1.52 | 64.1  | Cover Glass |
| S22 | infinity |     |      |       |       |

In Table 1, the radius of curvature refers to the radius of curvature of each surface, and the thickness refers to a linear distance along the optical axis O between two neighboring surfaces. For example, the thickness of surface S1 is the linear distance along the optical axis O between the surface S1 and the surface S2. The thickness, index of refraction, and Abbe number corresponding to each of the lenses listed in the "Remarks" column can be found in the corresponding values for the thickness, distance, index of refraction, and Abbe number from each row.

Additionally, in Table 1, the surfaces S1 and S2 are two surfaces of the first lens 112. The surfaces S3, S4, and S5 are three surfaces of the prism 114. The surfaces S6 and S7 are two surfaces of the second lens 122, the surface S8 is the surface of the third lens 124 facing the object side, the surface S9 is the surface connecting the third lens 124 and the fourth lens 126, and the surface S10 is the surface of the fourth lens 126 facing the image side. The surface S11 is the surface of the aperture stop 150. The surfaces S12 and S13 are two surfaces of the fifth lens 128. The surface S14 is the surface of the sixth lens 132 facing the object side, the surface S15 is the surface connecting the sixth lens 132 and the seventh lens 134, and the surface S16 is the surface of the seventh lens 134 facing the image side. The surfaces S17 and S18 are two surfaces of the eighth lens 142. The surfaces S19 and S20 are two surfaces of the cut filter 160. The surfaces S21 and S22 are two surfaces of the cover glass 170.

The above surfaces S1, S2, S12, and S13 are aspheric surfaces, and an aspheric surface can be expressed by the following formula:

$$Z(y) = \frac{cy^2}{1 + \sqrt{1 - (1+K)c^2y^2}} + A_1y^2 + A_2y^4 + A_3y^6 + A_4y^8 + A_5y^{10}$$

where Z is the sag along the direction of the optical axis O, c is the reciprocal of the radius of the osculating sphere, which is also the reciprocal of the radius of curvature near the optical axis O (e.g. the radius of curvature for the surfaces S1 and S2 listed in Table 1). Moreover, K is the 2nd order conic constant, y is the vertical distance of the aspheric surface to the optical axis O, or the height from the center to the edge of the lens, and A1-A5 are aspheric coefficients, in which A1 is 0. The parameter values of surfaces S1, S2, S12, and S13 are listed in Table 2.

TABLE 2

| Aspheric Surface Parameter | S1 | S2 | S12 | S13 |
|---|---|---|---|---|
| 2nd order conic constant K | 0 | 0 | 0 | 0 |
| Coefficient A2 | −5.808177E−4 | −2.244663E−3 | −6.141813E−4 | 1.501509E−3 |
| Coefficient A3 | 7.219522E−5 | −5.900177E−5 | 1.203767E−4 | 1.670878E−4 |
| Coefficient A4 | −4.022809E−6 | 4.382737E−6 | −1.884695E−05 | −4.067402E−5 |
| Coefficient A5 | 9.085019E−8 | −1.126882E−6 | 6.32233E−6 | 1.135369E−5 |

TABLE 3

| | | Wide-end | Middle Position | Tele-end |
|---|---|---|---|---|
| Effective Focal Length (EFL) (mm) | | 4.77 | 8.59 | 13.6 |
| Variable Interval (mm) | S5 | 7.85 | 3.66 | 0.5 |
| | S13 | 0.8 | 1.38 | 2.92 |
| | S16 | 1.55 | 5.15 | 6.78 |

In Table 3, several important parameters are listed for the zoom lens 100 at the wide-end, the middle position, and the tele-end, including the effective focal length as well as the variable intervals of the surfaces S5, S13, and S16. Moreover, a range of the effective focal length of the zoom lens 100 of the embodiment is, for example, 4.77 mm to 13.6 mm. A range of the F-number is, for example, 3 to 5.9. Additionally, a range of a field of view is, for example, 23.4 degrees to 64.1 degrees. Further, the parameter value L/fw of the zoom lens 100 corresponding to Table 1 is 1.69, the parameter value D1/fw is 1.53, and the parameter value fG4/fw is 3.08. In other words, the zoom lens 100 corresponding to Table 1 satisfies the aforementioned conditions (1)-(3).

Figure 2A:
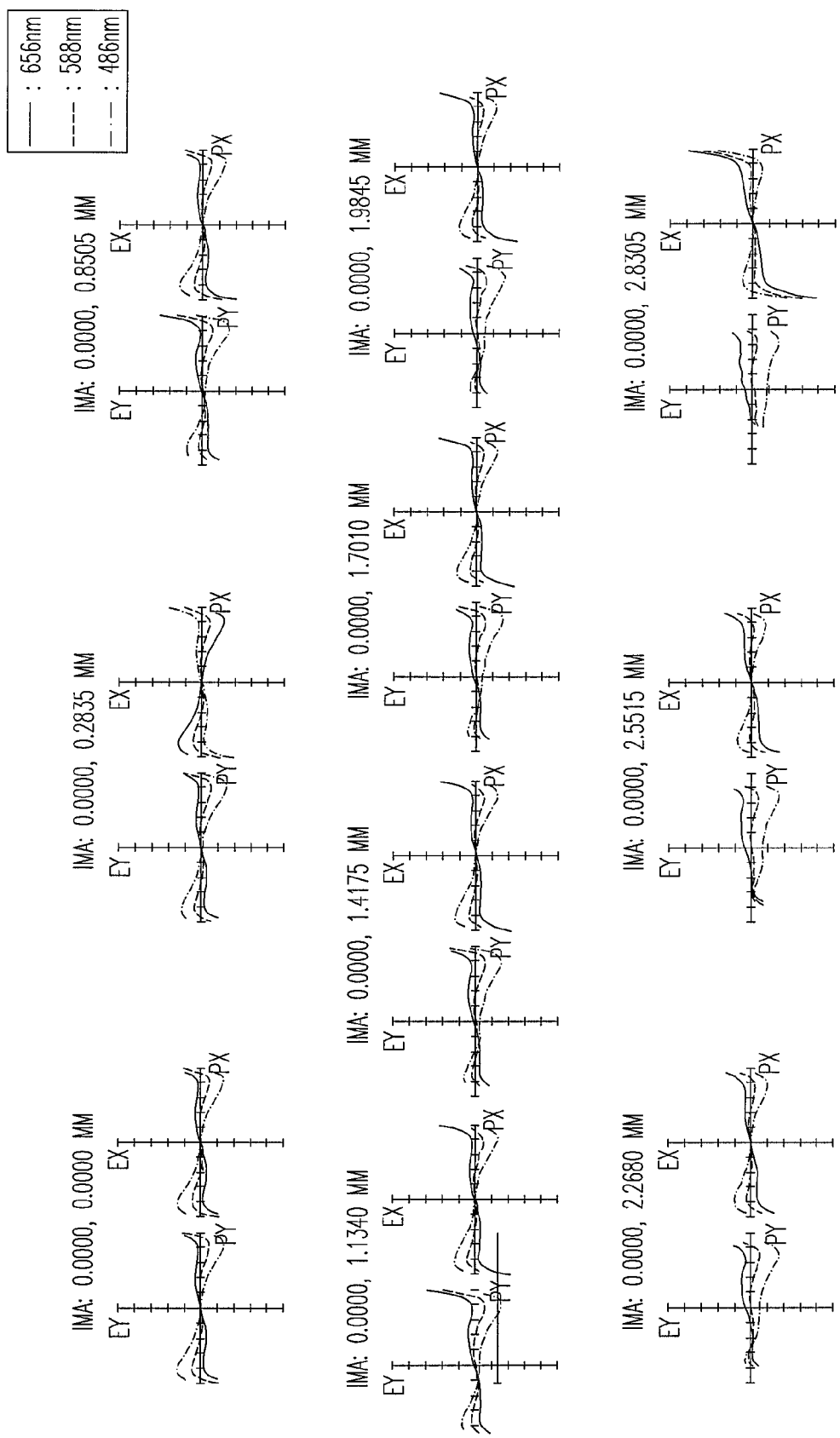
FIGS. 2A and 2B are optical simulation data diagrams of a wide-end imaging of the zoom lens corresponding to FIG. 1A.
Figure 2B:
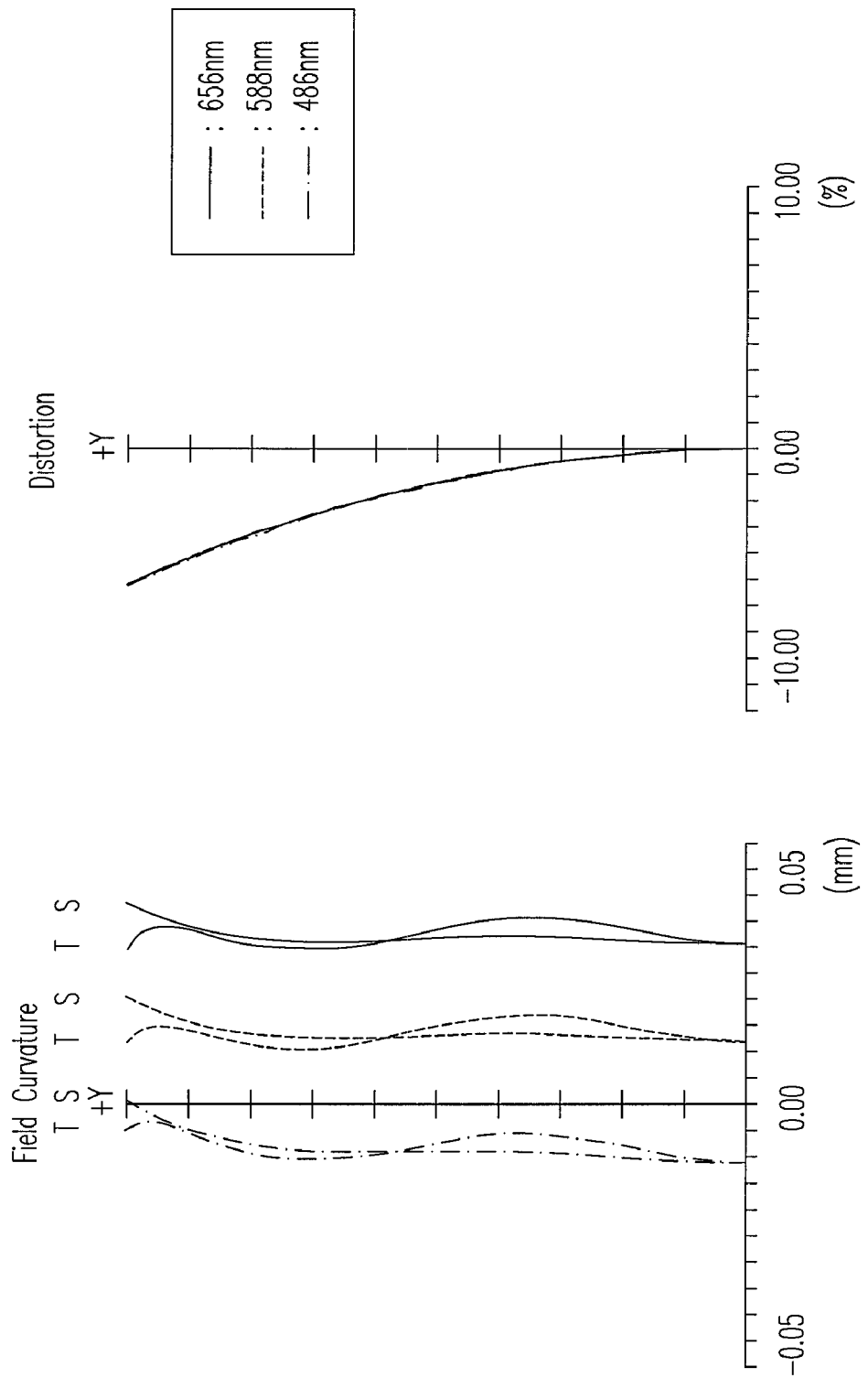
Figure 2C:
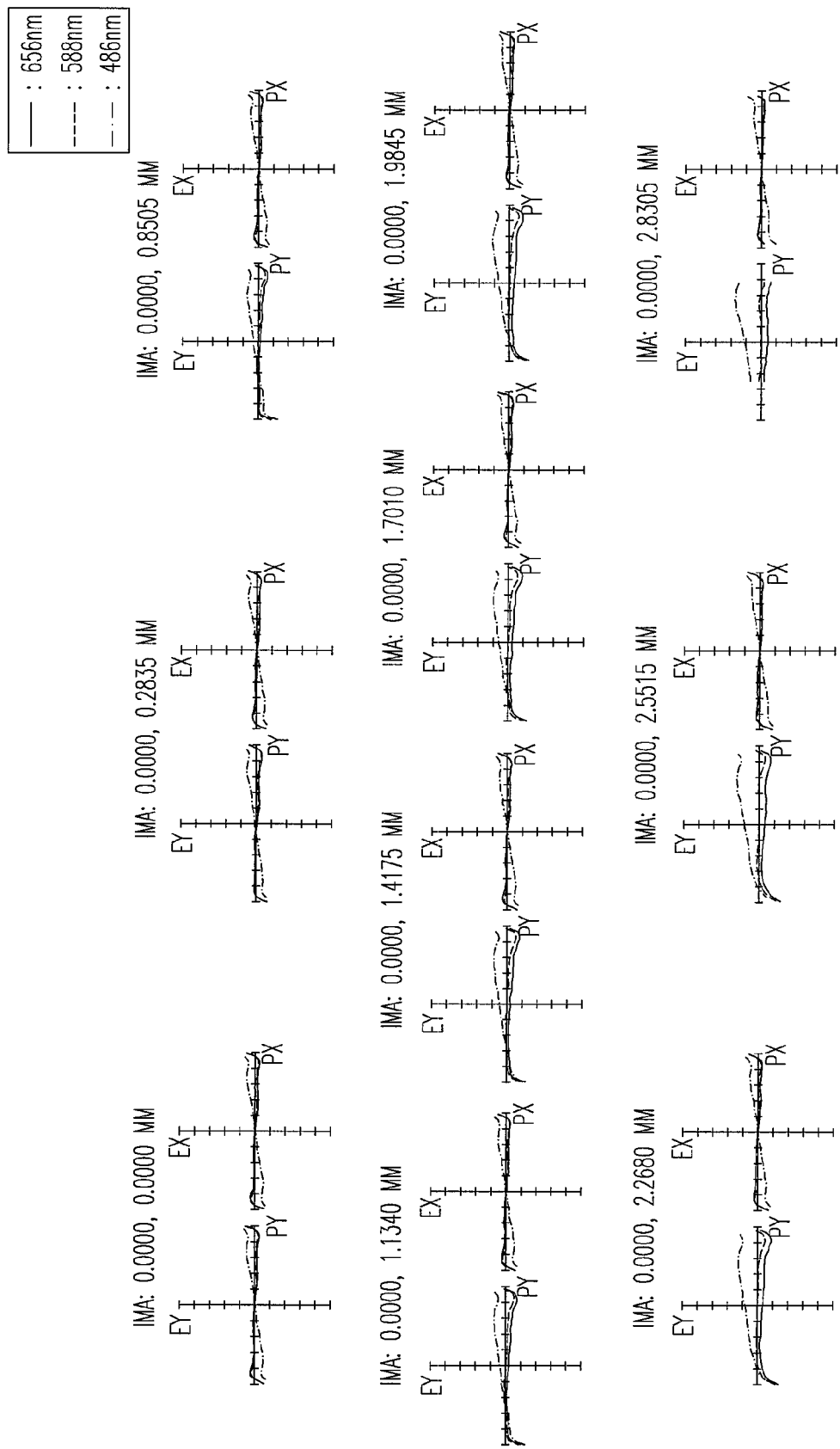
FIGS. 2C and 2D are optical simulation data diagrams of a tele-end imaging of the zoom lens corresponding to FIG. 1C.
Figure 2D:
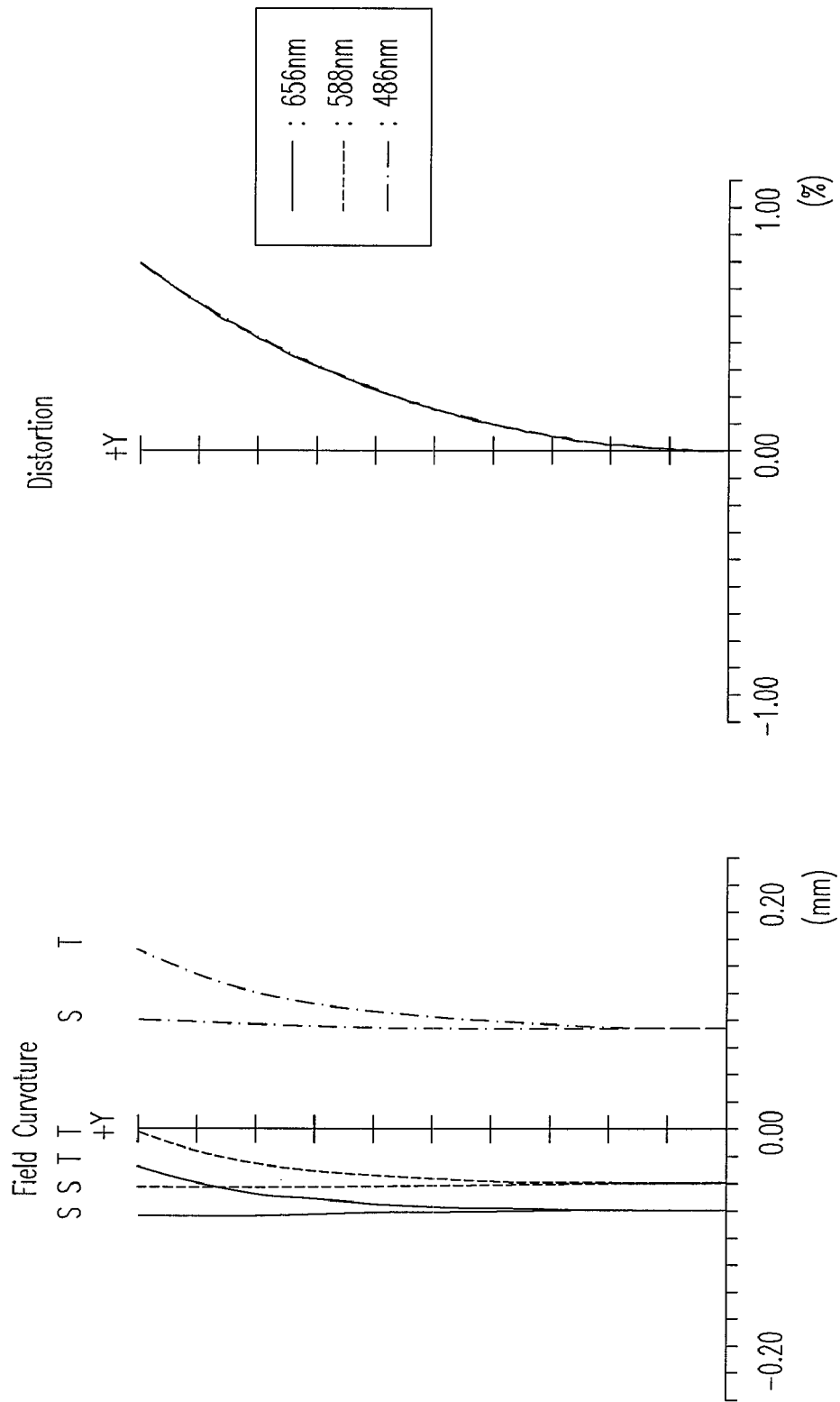

FIGS. 2A and 2B are optical simulation data diagrams of a wide-end imaging of the zoom lens 100 corresponding to Table 1 and FIG. 1A. FIGS. 2C and 2D are optical simulation data diagrams of a tele-end imaging of the zoom lens 100 corresponding to Table 1 and FIG. 1C. Simulations are performed with reference wavelengths of a 656 nm red light, a 588 nm green light, and a 486 nm blue light, respectively. FIGS. 2A and 2C are transverse ray fan plots, and each diagram in FIGS. 2B and 2D are field curvature and distortion plots arranged from left to right in sequence. Since all the plots shown in FIGS. 2A through 2C fall within a standard range, the zoom lens 100 of the embodiment can have a preferable imaging quality.

Another embodiment of the zoom lens 100 is given hereinafter, in which the eighth lens 142 corresponding to Table 4 is an aspheric lens. However, the invention is not limited to the data listed in Table 4. It should be known to those ordinarily skilled in the art that various modifications and variations can be made to the parameters and structure of the invention without departing from the scope or spirit of the invention.

TABLE 4

| Surface | Radius of Curvature (mm) | Thickness (mm) | Refractive Index | Abbe Number | Remarks |
|---|---|---|---|---|---|
| S1 | −45.77 | 0.9 | 1.53 | 56.04 | First Lens |
| S2 | 3.71 | 1.38 | | | |
| S3 | infinity | 2.89 | 1.79 | 44.2 | Prism |
| S4 | infinity | 2.89 | 1.79 | 44.2 | |
| S5 | infinity | 7.84 | | | |
| S6 | 5.98 | 1.61 | 1.52 | 52.43 | Second Lens |
| S7 | −36.35 | 0.1 | | | |
| S8 | 5.57 | 1.87 | 1.49 | 70.24 | Third Lens |

TABLE 4-continued

| Surface | Radius of Curvature (mm) | Thickness (mm) | Refractive Index | Abbe Number | Remarks |
|---|---|---|---|---|---|
| S9 | −7.50 | 0.6 | 1.8 | 46.57 | Fourth Lens |
| S10 | 5.36 | 0.44 | | | |
| S11 | infinity | 0.1 | | | Aperture Stop |
| S12 | 5.02 | 1.54 | 1.58 | 59.33 | Fifth Lens |
| S13 | −8.48 | 0.77 | | | |
| S14 | 7.68 | 1.44 | 1.49 | 70.24 | Sixth Lens |
| S15 | −4.33 | 0.6 | 1.83 | 37.16 | Seventh Lens |
| S16 | 4.90 | 1.55 | | | |
| S17 | 171.81 | 1.04 | 1.53 | 48.84 | Eighth Lens |
| S18 | −7.41 | 3.36 | | | |
| S19 | infinity | 0.3 | 1.52 | 64.14 | Cut Filter |
| S20 | infinity | 0.1 | | | |
| S21 | infinity | 0.45 | 1.52 | 64.14 | Cover Glass |
| S22 | infinity | | | | |

In Table 4, the definitions of each parameter and the surfaces corresponding to the lenses are not repeatedly described hereafter, since reference to the above description can be made. Moreover, the surfaces S1, S2, S12, S13, S17, and S18 in Table 4 are aspheric surfaces, and the aspheric surface may be expressed by referring to the above description, hence further illustration is omitted hereafter. The parameter values of surfaces S1, S2, S12, S13, S17, and S18 are listed in Table 5.

TABLE 5

| Aspheric Surface Parameter | S1 | S2 | S12 | S13 | S17 | S18 |
|---|---|---|---|---|---|---|
| 2nd order conic constant K | 0 | 0 | 0 | 0 | 0 | 0 |
| Coefficient A2 | −5.808177E−4 | −2.295287E−3 | −5.195259E−4 | 1.508538E−3 | −7.118435E−4 | −3.428013E−4 |
| Coefficient A3 | 7.219522E−5 | −5.900177E−5 | 1.21247E−4 | −1.680628E−4 | −1.563624E−5 | 5.52005E−6 |
| Coefficient A4 | −4.022809E−6 | 3.337835E−6 | −1.835197E−5 | −4.046931E−5 | 5.662163E−6 | −1.267627E−6 |
| Coefficient A5 | 9.246317E−8 | −1.043630E−6 | 7.018512E−6 | −1.202049E−5 | −5.013675E−7 | −4.896711E−9 |

TABLE 6

|  |  | Wide-end | Middle Position | Tele-end |
|---|---|---|---|---|
| Effective Focal Length (EFL) (mm) |  | 4.55 | 7.91 | 12.52 |
| Variable Interval (mm) | S5 | 7.84 | 3.82 | 0.62 |
|  | S13 | 0.77 | 1.33 | 2.86 |
|  | S16 | 1.55 | 5.01 | 6.69 |

In Table 6, several important parameters are listed for the zoom lens 100 at the wide-end, the middle position, and the tele-end, including the effective focal length as well as the variable intervals of the surfaces S5, S13, and S16. Moreover, a range of the effective focal length corresponding to the zoom lens 100 of Table 6 is, for example, 4.55 mm to 12.52 mm. A range of the F-number is, for example, 2.88 to 5.5. Additionally, a range of a field of view is, for example, 25.05 degrees to 66.8 degrees. Further, the parameter value L/fw of the zoom lens 100 corresponding to Table 4 is 1.77, the parameter value D1/fw is 1.65, and the parameter value fG4/fw is 2.94. In other words, the zoom lens 100 corresponding to Table 4 satisfies the aforementioned conditions (1)-(3).

Figure 3A:
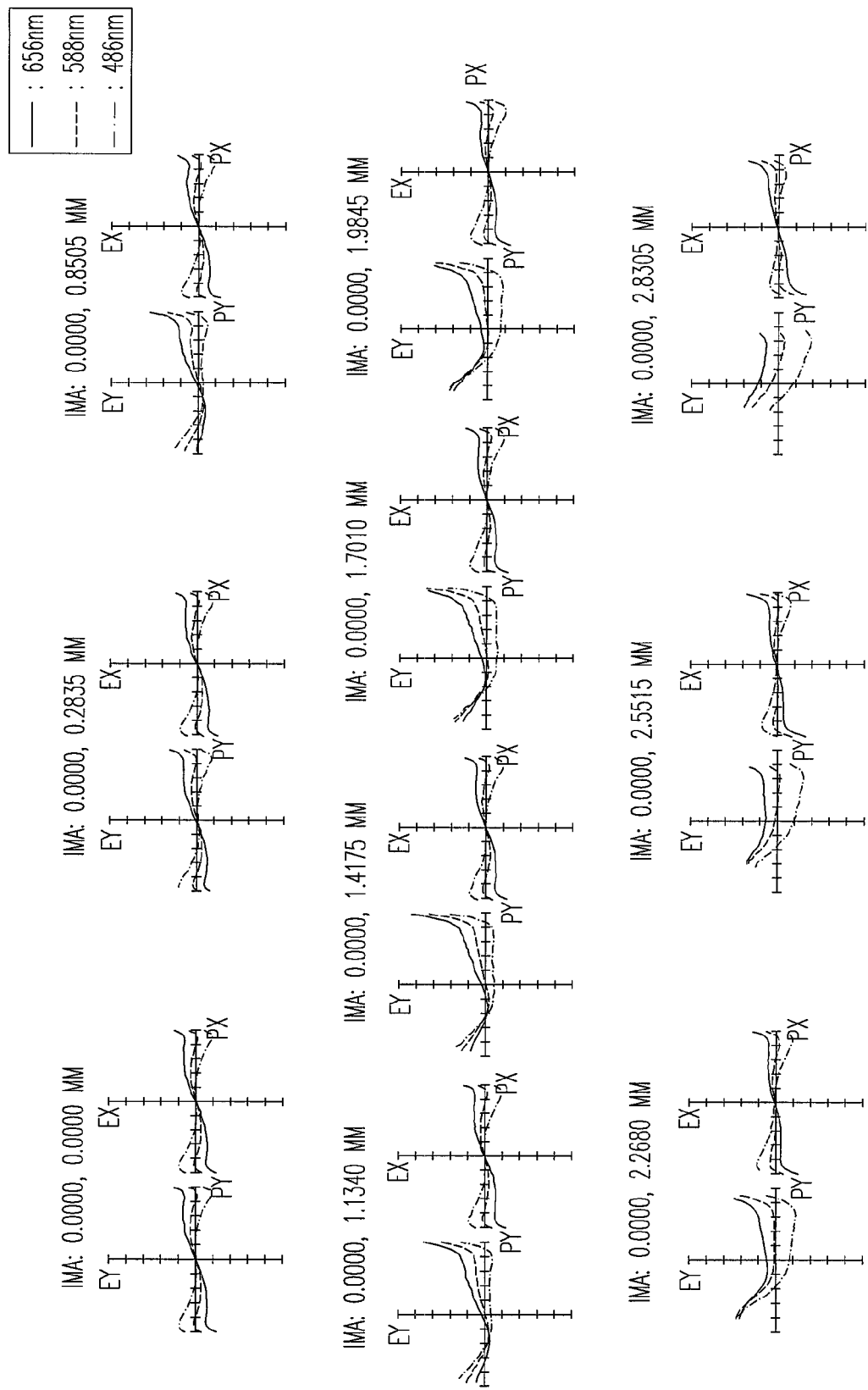
FIGS. 3A and 3B are optical simulation data diagrams of a wide-end imaging of the zoom lens corresponding to FIG. 1A.
Figure 3B:
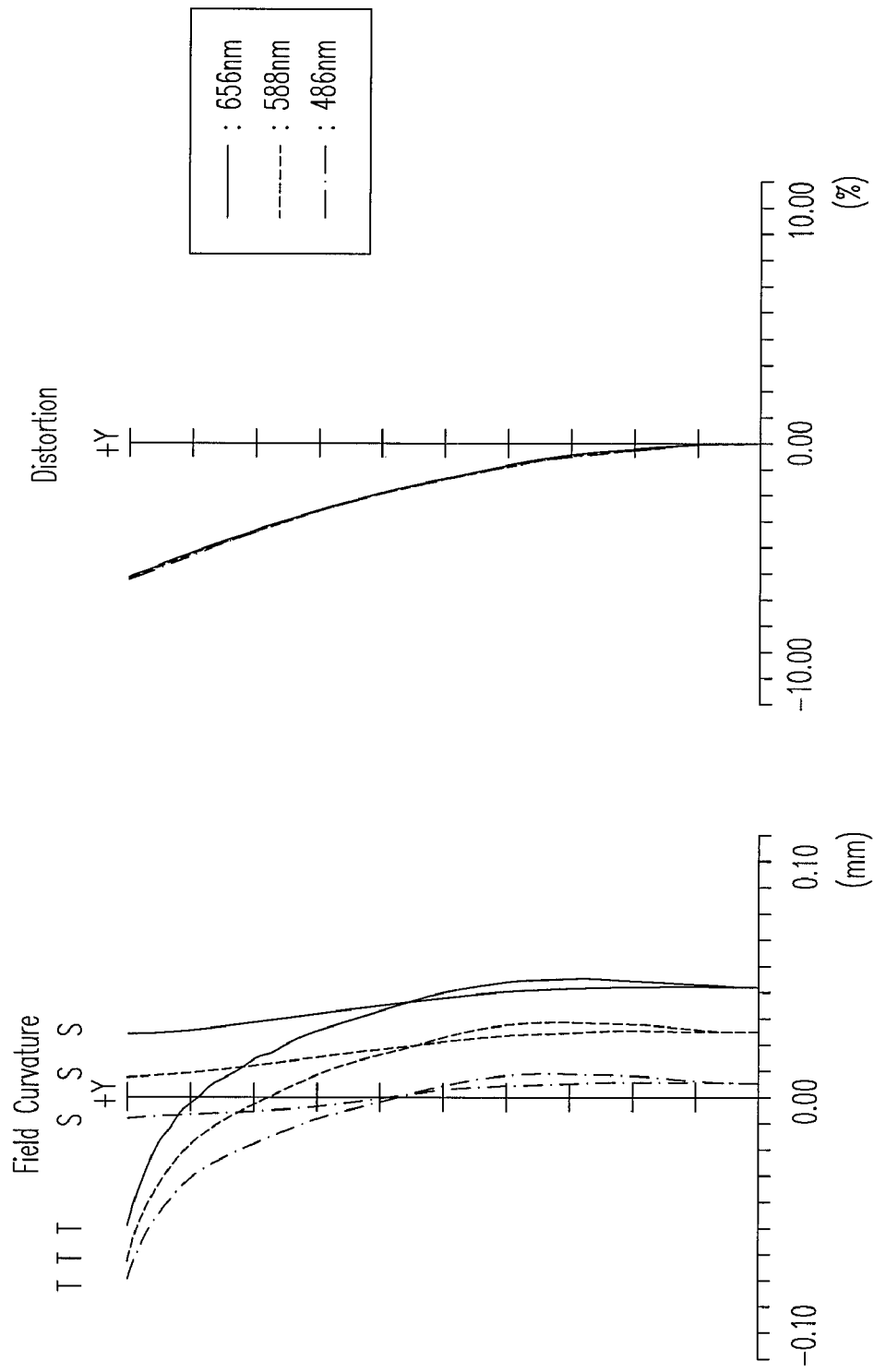
Figure 3C:
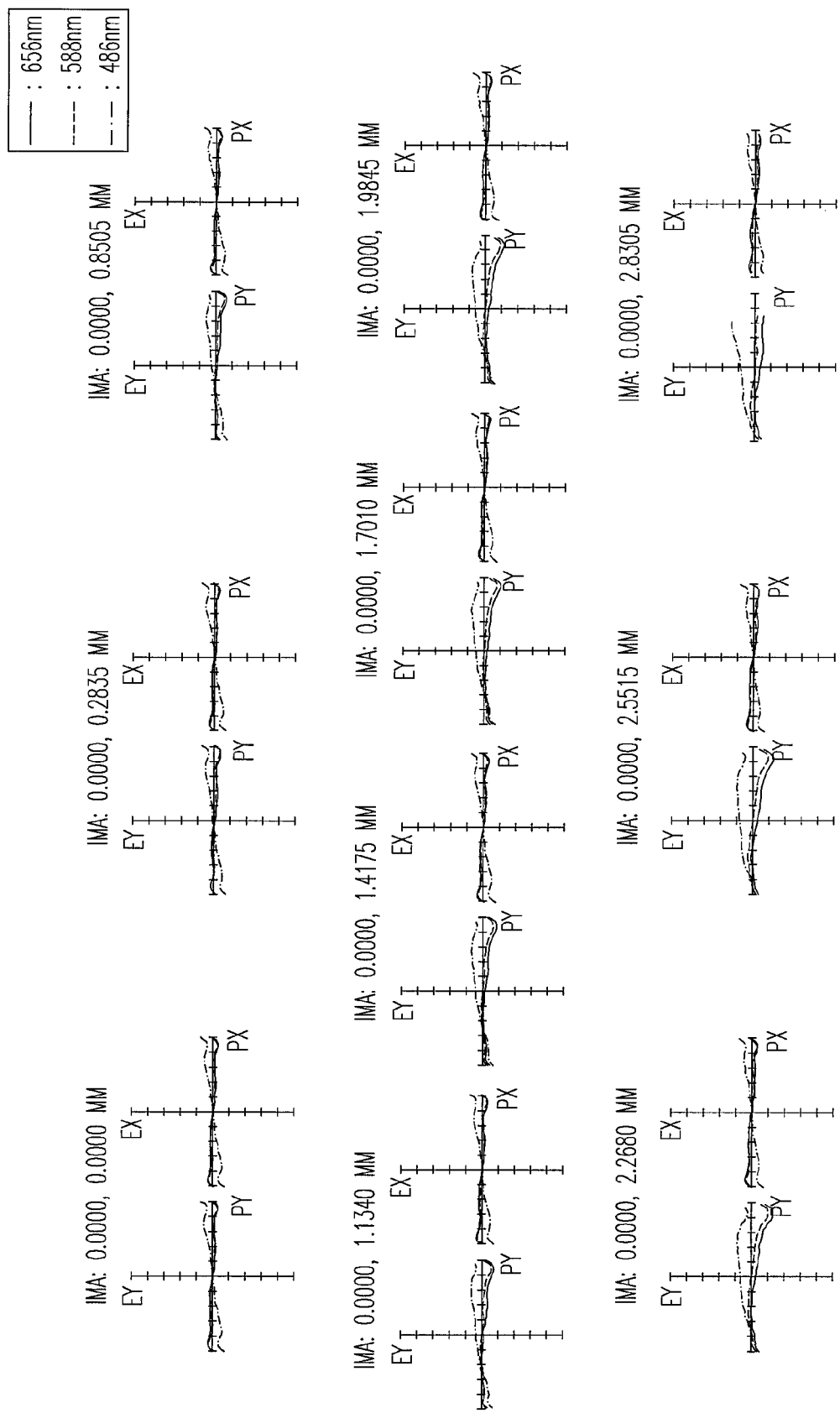
FIGS. 3C and 3D are optical simulation data diagrams of a tele-end imaging of the zoom lens corresponding to FIG. 1C.
Figure 3D:
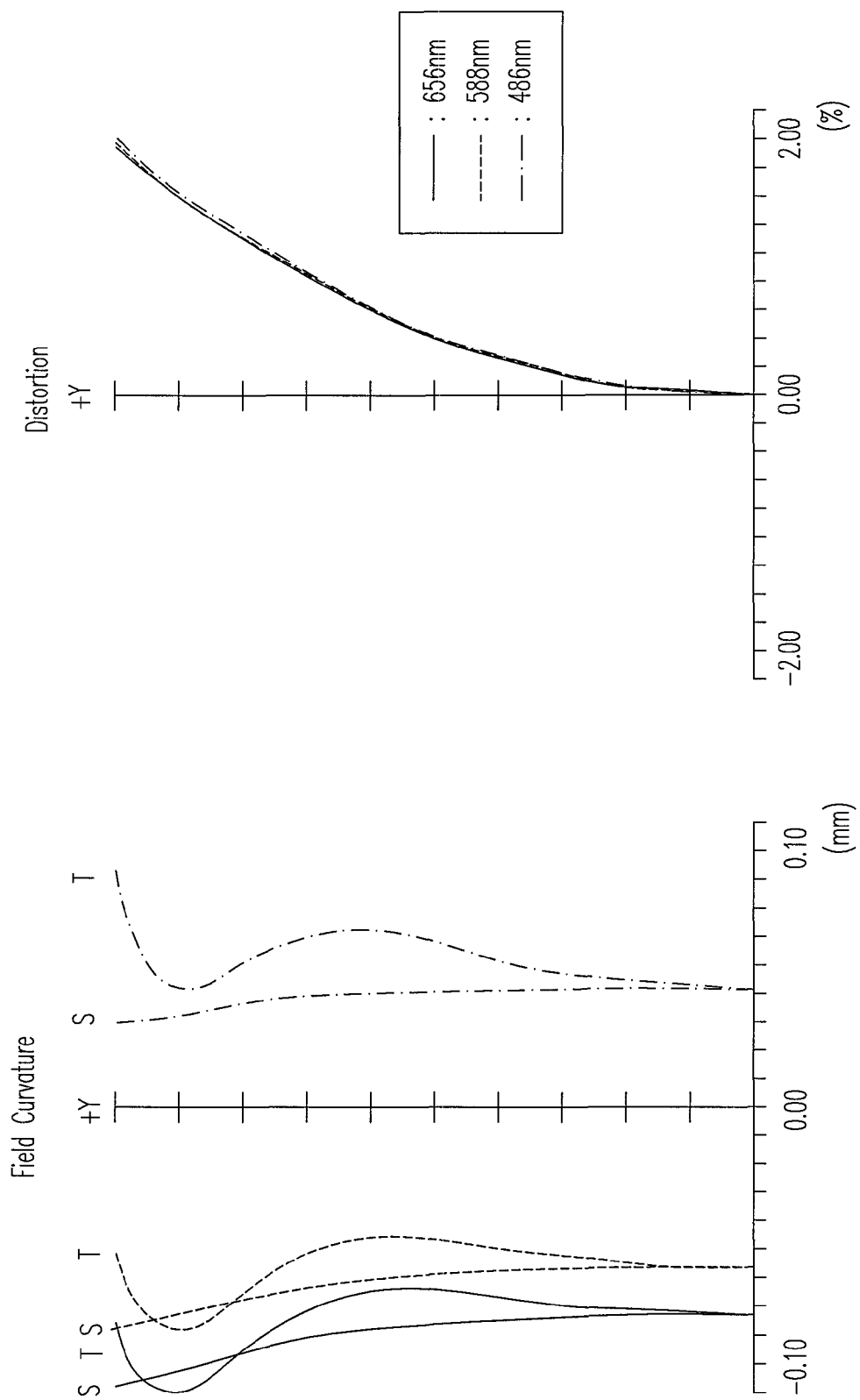

FIGS. 3A and 3B are optical simulation data diagrams of a wide-end imaging of the zoom lens 100 corresponding to Table 4 and FIG. 1A. FIGS. 3C and 3D are optical simulation data diagrams of a tele-end imaging of the zoom lens 100 corresponding to Table 4 and FIG. 1C. Simulations are performed with reference wavelengths of a 656 nm red light, a 588 nm green light, and a 486 nm blue light, respectively. FIGS. 3A and 3C are transverse ray fan plots, and each diagram in FIGS. 3B and 3D are field curvature and distortion plots arranged from left to right in sequence. Since all the plots shown in FIGS. 3A through 3C fall within a standard range, the zoom lens 100 of the embodiment can have a preferable imaging quality.

In view of the foregoing, the embodiments of the invention can achieve at least one of the following advantages or effects. The four lens groups of the embodiment adopt a negative, positive, negative, positive combination for the refractive powers thereof, thereby effectively eliminating the image aberration. Moreover, with complementing aspheric lenses, double cemented lenses, and prisms, effects of large stops, wide view angle, and miniaturization are achieved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, these claims of the invention may refer to use "first", "second", etc. following with noun or element. Such terms should be understood as a nomenclature and should not be construed as giving the limitation on the number of the elements modified by such nomenclature unless specific number has been given. The abstract and the headings are merely used to aid in searches of patent files and are not intended to limit the scope of the claims of the invention.

What is claimed is:

1. A zoom lens disposed between an object side and an image side, the zoom lens comprising from the object side to the image side arranged in sequence:

a first lens group having a negative refractive power, the first lens group comprising a first lens and a prism arranged in sequence from the object side to the image side, and the first lens being an aspheric lens, wherein a distance between the first lens and the prism is L, an effective focal length of the zoom lens at a wide-end is fw, and 1.58<L/fw<1.88;

a second lens group having a positive refractive power and disposed between the first lens group and the image side, and the second lens group comprising a first double cemented lens;

a third lens group having a negative refractive power and disposed between the second lens group and the image side, and the third lens group comprising a second double cemented lens; and a fourth lens group having a positive refractive power and disposed between the third lens group and the image side.

2. The zoom lens as claimed in claim 1, wherein a diameter of the first lens is D1, and $1.45 < D1/fw < 1.8$.

3. The zoom lens as claimed in claim 1, wherein an effective focal length of the fourth lens group is fG4, and $2.6 < fG4/fw < 3.9$.

4. The zoom lens as claimed in claim 1, wherein an refractive index of the prism is Ndp, and $Ndp > 1.69$.

5. The zoom lens as claimed in claim 1, wherein the refractive power of the first lens is negative.

6. The zoom lens as claimed in claim 1, wherein the first lens is a biconcave lens.

7. The zoom lens as claimed in claim 1, wherein the second lens group further comprises a second lens, a third lens, a fourth lens, and a fifth lens, and the third lens and the fourth lens are formed a first double cemented lens.

8. The zoom lens as claimed in claim 7, wherein the refractive powers of the second lens and the fifth lens are both positive.

9. The zoom lens as claimed in claim 7, wherein the second lens and the fifth lens are biconvex lenses.

10. The zoom lens as claimed in claim 7, wherein the refractive powers of the third lens and the fourth lens are opposite to each other.

11. The zoom lens as claimed in claim 7, wherein the third lens is a biconvex lens, and the fourth lens is a biconcave lens.

12. The zoom lens as claimed in claim 7, wherein the fifth lens is an aspheric lens.

13. The zoom lens as claimed in claim 1, wherein the second double cemented lens is formed by a sixth lens and a seventh lens, and the refractive powers of the sixth lens and the seventh lens are opposite to each other.

14. The zoom lens as claimed in claim 13, wherein the sixth lens is a biconvex lens, and the seventh lens is a biconcave lens.

15. The zoom lens as claimed in claim 1, wherein the fourth lens group comprises an eighth lens, and the eighth lens is an aspheric lens.

16. The zoom lens as claimed in claim 15, wherein the refractive power of the eighth lens is positive.

17. The zoom lens as claimed in claim 15, wherein the eighth lens is a biconvex lens.

18. The zoom lens as claimed in claim 1, wherein the fourth lens group comprises an eighth lens, and the eighth lens is a spherical lens.

19. The zoom lens as claimed in claim 18, wherein the refractive power of the eighth lens is positive.

20. The zoom lens as claimed in claim 18, wherein the eighth lens is a biconvex lens.

21. The zoom lens as claimed in claim 1, wherein the second lens group is adapted to move between the first lens group and the third lens group.

22. The zoom lens as claimed in claim 1, wherein the third lens group is adapted to move between the second lens group and the fourth lens group.

23. The zoom lens as claimed in claim 1, further comprising an aperture stop disposed in the second lens group.

* * * * *